(12) United States Patent
Gyarmati (10) Patent No.: US 12,292,104 B2
(45) Date of Patent: May 6, 2025

(54) TRANSMISSION FOR A VEHICLE, AND DRIVE TRAIN HAVING SUCH A TRANSMISSION

(71) Applicant: ZF Friedrichshafen AG, Friedrichshafen (DE)

(72) Inventor: Tamas Gyarmati, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/618,048

(22) Filed: Mar. 27, 2024

(65) Prior Publication Data
US 2024/0328497 A1 Oct. 3, 2024

(30) Foreign Application Priority Data
Mar. 28, 2023 (DE) .......................... 102023202836.0

(51) Int. Cl.
*F16H 48/10* (2012.01)
*B60K 17/16* (2006.01)
(Continued)

(52) U.S. Cl.
CPC ........... *F16H 48/10* (2013.01); *B60K 17/165* (2013.01); *F16H 48/40* (2013.01); *F16H 57/029* (2013.01);
(Continued)

(58) Field of Classification Search
CPC ........ F16H 48/10; F16H 48/40; F16H 57/029; F16H 57/031; F16H 57/032;
(Continued)

(56) References Cited

U.S. PATENT DOCUMENTS 3,365,986 A * 1/1968 Mazziotti .............. F16H 1/2809
475/346
8,545,732 B2 * 10/2013 Nakagawa .............. F03G 7/005
252/511
(Continued)

FOREIGN PATENT DOCUMENTS

| DE | 102013215877 B4 | 6/2016 | |
| DE | 102021207527 A1 * | 1/2023 | ......... F16H 57/0426 |
| WO | WO-2005120877 A1 * | 12/2005 | ............. B60K 17/16 |

OTHER PUBLICATIONS

English translation of DE102021207527A1; http://translationportal.epo.org; Aug. 15, 2024 (Year: 2024).*

*Primary Examiner* — Roger L Pang
(74) *Attorney, Agent, or Firm* — Dority & Manning, P.A (57) ABSTRACT

A transmission (3) for a drive train (2) includes a differential (7) arranged spatially within a housing part (11). The differential includes a first planetary gear set (29) and at least one second planetary gear set (30), which is operatively connected to the first planetary gear set. The housing part (11) includes at least one lubricant feed (15) configured for fluidically connecting a lubricant supply of the transmission (3) to an annular duct (46) formed, at least partially circumferentially, spatially between a planet carrier (32b) of the second planetary gear set (30) and the housing part (11). The planet carrier (32b) of the second planetary gear set (30) is arranged on the housing part (11) in a rotationally fixed and axially secured manner.

14 Claims, 3 Drawing Sheets

(51) Int. Cl.
*F16H 48/40* (2012.01)
*F16H 57/029* (2012.01)
*F16H 57/031* (2012.01)
*F16H 57/032* (2012.01)
*F16H 57/04* (2010.01)
*F16H 57/02* (2012.01)

(52) U.S. Cl.
CPC ......... *F16H 57/031* (2013.01); *F16H 57/032* (2013.01); *F16H 57/0424* (2013.01); *F16H 57/043* (2013.01); *F16H 57/0483* (2013.01); *F16H 2048/104* (2013.01); *F16H 2048/106* (2013.01); *F16H 2057/02052* (2013.01)

(58) Field of Classification Search
CPC ............... F16H 57/0424; F16H 57/043; F16H 57/0483; F16H 2048/104; F16H 2048/106; F16H 2507/02052; F16H 57/082; B60K 17/165
USPC ................................ 475/160, 330, 903, 331
See application file for complete search history.

(56) References Cited

U.S. PATENT DOCUMENTS

| | | | |
|---|---|---|---|
| 9,878,606 B2 * | 1/2018 | Kobayashi | B60K 6/547 |
| 2014/0141918 A1 * | 5/2014 | Fukami | B60K 17/165 |
| | | | 475/150 |
| 2022/0010782 A1 * | 1/2022 | Hoelzl | F03D 9/25 |
| 2024/0035560 A1 * | 2/2024 | Hitpass | F16H 57/0431 |

* cited by examiner

Fig. 4 designed to fluidically connect a lubricant supply of the transmission to an annular duct, which is formed, at least partially circumferentially, spatially between a planet carrier of the second planetary gear set and the housing part, and wherein the planet carrier of the second planetary gear set is arranged on the housing part in a rotationally fixed and axially secured manner.

The interface between the planet carrier of the second planetary gear set and the housing part, which can be, for example, a housing cover or the like, is therefore implemented such that at least the functions of oil feed and torque support are fulfilled, without the need to make changes to the installation space in the transmission and without the need for the drive unit, including the housing of the drive unit, against which the housing-fixed gear set element of the transmission was previously supported, to be connected to the transmission. A transmission of this type therefore does not require any additional radial or axial installation space. In addition, no pressing-in processes are necessary. Furthermore, the assembly process is simplified, since the components are simply bolted together.

The differential is designed to be operatively arranged between an input shaft and a first output shaft and a second output shaft when the drive train is installed. The differential therefore distributes a drive power which is applied at the input shaft onto the two output shafts when the drive train is installed. The differential can have any design. Preferably, the differential is an integral differential, wherein a first output torque is at least indirectly transmittable onto the second output shaft by the first planetary gear set of the differential, wherein a support torque of the first planetary gear set is convertible in the second planetary gear set of the differential such that a second output torque, which corresponds to the first output torque, is transmittable onto the first output shaft.

An integral differential is to be understood in the framework of this invention to be a differential which has both a first planetary gear set and a second planetary gear set, which is operatively connected to the first planetary gear set, wherein the first planetary gear set is drivingly connected to the input shaft, to the second planetary gear set and at least indirectly to the first output shaft. In addition, the second planetary gear set is drivingly connected to the second output shaft. The input torque at the input shaft is convertible by such an integral differential and is distributable and transmittable at a defined ratio onto the two output shafts. Preferably, fifty percent (50%), i.e., half, of the input torque is transmitted onto each of the output shafts. Therefore, the differential does not have a component that is subjected to both output torques. In other words, the two torques are never combined. Furthermore, the differential has no gears that rotate in a block, or without a rolling motion, when the output rotational speeds of the output shafts are identical. Consequently, the intermeshed components of the differential always rotate in relation to one another, independently of the output rotational speeds of the output shafts.

A "planetary gear set" is to be understood to be a unit which includes a sun gear, a ring gear and multiple planet gears guided by a planet carrier on a circular path around the sun gear, wherein the planet gears are meshed with the ring gear and the sun gear.

The aforementioned lubricant feed is used, in particular, to supply the second planetary gear set with coolant and/or lubricant, the coolant and/or lubricant being fed radially and/or axially through the housing part via the lubricant feed to the annular duct. Sealing elements can be provided, which are arranged radially between the housing part and the outer

TRANSMISSION FOR A VEHICLE, AND DRIVE TRAIN HAVING SUCH A TRANSMISSION

CROSS-REFERENCE TO RELATED APPLICATION

The present application is related and has right of priority to German Patent Application No. DE102023202836.0 filed on Mar. 28, 2023, which is incorporated by reference in its entirety for all purposes.

TECHNICAL FIELD

The invention relates generally to a transmission for a drive train of a vehicle and to a drive train having such a transmission.

BACKGROUND

DE 10 2013 215 877 B4 describes an epicyclic gear train for branching the drive power applied at a power input to a first power output and to a second power output in conjunction with reducing the output rotational speed to a rotational speed level that is below the input rotational speed at the power input. The epicyclic gear train has a first planetary gear stage, which includes a first sun gear, a first planetary gear set, a first planet carrier and a first ring gear. The epicyclic gear train also has a second planetary gear stage, which includes a second sun gear, a second planetary gear set, a second planet carrier and a second ring gear. The epicyclic gear train also has a third planetary gear stage, which includes a third sun gear, a third planetary gear set, a third planet carrier and a third ring gear. The first sun gear acts as a power input, wherein the first planet carrier is connected to the second sun gear for conjoint rotation. The second planet carrier is fixed in position, the first ring gear is connected to the third sun gear for conjoint rotation and the third ring gear is connected to the second planet carrier for conjoint rotation. A first power output is brought about via the third planetary gear stage, wherein a second power output is brought about via the second ring gear of the second planetary gear stage.

In known transmissions, the housing-fixed gear set element of the planetary gear set is supported against the housing of the drive unit, for example, via a crown gearing or the like. This housing can be, for example, the housing which accommodates the stator in an at least rotationally fixed manner. In order to store and transport the fully assembled transmission, it is therefore necessary to already connect the drive unit to the transmission, or vice versa, in order to avoid components of the transmission becoming detached and dropping out.

BRIEF SUMMARY

Example aspects of the present invention provide a compact transmission for a drive train, which can be preassembled and transported and stored without the need to have, for example, a drive unit or other components of a drive train connected thereto.

Example aspects of invention relate to a transmission for a drive train of a vehicle with a differential arranged spatially within a housing part, the differential having a first planetary gear set and at least one second planetary gear set, which is operatively connected to the first planetary gear set, wherein the housing part has at least one lubricant feed, which is circumference of the planet carrier of the second planetary gear set in order to seal the lubricant feed, the annular duct and, optionally, further ducts with respect to the rest of the transmission interior. These sealing elements can be, for example, O-rings, at least one of these sealing elements being arranged in front of the annular duct in an axial direction and at least one of these sealing elements being arranged behind the annular duct in an axial direction. Corresponding circumferential grooves for receiving the respective sealing element can be formed in the housing part and/or in the planet carrier of the second planetary gear set.

The annular duct can be formed at least partially circumferentially on the outer circumference of a planet carrier of the second planetary gear set. Alternatively, the annular duct can be formed at least partially circumferentially on the inner circumference of the housing part. Further alternatively, the annular duct can be formed both at least partially circumferentially on the outer circumference of a planet carrier of the second planetary gear set and at least partially circumferentially on the inner circumference of the housing part. The annular duct is supplied with coolant and/or lubricant via the lubricant feed, which is formed in the housing part and conducts the coolant and/or lubricant via at least one first duct on the planet carrier of the second planetary gear set into a fluid chamber or directly into a duct in a planet shaft, which is arranged on the planet carrier of the second planetary gear set. The further duct is designed, in particular, to supply lubricant to at least one bearing element for mounting a planet gear of the second planetary gear seat, the planet gear being rotatably accommodated on the planet shaft.

Preferably, the first planetary gear set is arranged, at least in part, radially inside the second planetary gear set. The planetary gear sets of the differential are therefore radially nested. The gear set elements of the first and the second planetary gear sets are therefore axially located in a common plane. Preferably, the first and the second planetary gear sets are located essentially in a common gear plane, enabling the transmission to be axially short and thus particularly compact, in particular axially. The first planetary gear set and the second planetary gear set are arranged radially above each other. It is also conceivable that the first and the second planetary gear sets are not arranged in a common plane, and instead the first planetary gear set is offset in an axial direction with respect to the second planetary gear set.

A transmission this type can be made available as a preassembled unit, which can be already completely assembled before the preassembled unit is connected to further units of the drive train, which, in particular, are also preassembled, such as, for example, the drive unit or housing components of the drive unit, the input shaft and the two output shafts.

Preferably, a first sun gear of the first planetary gear set is designed to be connected to the input shaft for conjoint rotation when the drive train is installed. Further preferably, a first planet carrier of the first planetary gear set is designed to be at least indirectly connected to the first output shaft for conjoint rotation. In addition, a first ring gear of the first planetary gear set is preferably at least indirectly connected to a second sun gear of the second planetary gear set for conjoint rotation. A second ring gear of the second planetary gear set is also preferably designed to be at least indirectly connected to the second output shaft for conjoint rotation. The planet carrier of the second planetary gear set, which is also referred to below as the second planet carrier, is connected to the housing part for conjoint rotation.

According to one exemplary embodiment, the second planet carrier is connected to the housing part for conjoint rotation via a driving tooth system. The driving tooth system is provided for supporting a torque on the transmission housing. In this sense, the housing part has an internal toothing on its inner circumference, which is meshed with an external toothing formed on the outer circumference of the second planet carrier of the second planetary gear set. As a result, a separable connection is established between the second planet carrier and the housing part, which can effectively transmit or support a torque during operation.

A housing part is to be understood to be a rotationally and axially fixed component of the transmission, for example, the transmission housing itself or a cover of the transmission housing. Components which are supported against the housing part are therefore arranged in a housing-fixed manner. The term "housing-fixed" is to be understood to mean that relative motion does not takes place or cannot take place between the second planet carrier and the housing part of the transmission.

If two components of the transmission are "connected" or "coupled" for conjoint rotation or are "connected to one another," this means, as set forth in the invention, that there is a permanent coupling of these components, such that the two components cannot rotate independently of each other. This is also to be understood as a permanent rotary joint. In particular, there are no shift elements between these components, which can be elements of the differential, and/or shafts, and/or a non-rotating component of the transmission, but instead, these components are permanently coupled to each other. An elastically rotating connection between two components is also understood to be permanent, or such that the elements rotate conjointly.

At least one first planet shaft is provided on the first planet carrier of the first planetary gear set for accommodating an associated first planet gear of the first planetary gear set, which is arranged between the first sun gear and the first ring gear. Preferably, multiple first planet shafts are provided on the planet carrier of the first planetary gear set for accommodating an associated first planet gear of the first planetary gear set. At least one second planet shaft is provided on the planet carrier of the second planetary gear set for accommodating an associated second planet gear of the second planetary gear set, which is arranged between the second sun gear and the second ring gear. Preferably, multiple second planet shafts are provided on the planet carrier of the second planetary gear set for accommodating an associated second planet gear of the second planetary gear set. Therefore, each planetary gear set can have one or multiple planet shaft(s) and, therefore, one or multiple planet gear(s).

The axially fixed arrangement of the second planet carrier of the second planetary gear set is preferably implemented by a securing ring or the like, which is arranged in an at least partially circumferential groove on the inner circumference of the housing part. In this sense, a securing ring is preferably provided in order to axially secure the planet carrier of the second planetary gear set.

According to one example refinement of the invention, a radial projection on the planet carrier of the second planetary gear set is arranged axially between the securing ring and an axial stop on the housing part. The radial projection is clamped between the securing ring and the axial stop on the housing part when the transmission is assembled, so that an axial relative movement between the second planet carrier of the second planetary gear set and the housing part is prevented. The axial stop is, in particular, an end face of the driving tooth system, i.e., of the internal toothing on the inner circumference of the housing part. Alternatively, the axial stop can be formed on a radial projection on the housing part.

Preferably, the second planet carrier of the second planetary gear set is radially secured on the housing part via at least one centering. Therefore, the interface between the planet carrier of the second planetary gear set and the housing part of the transmission housing is implemented, furthermore, such that the function of centering is fulfilled without the need to make changes to the installation space.

Preferably, the driving tooth system is arranged axially between the securing ring and the centering. As a result, an axially compact design is achieved.

Further preferably, the lubricant feed is arranged axially between the securing ring and the centering. Therefore, the annular duct is also arranged axially between the securing ring and the centering. As a result, an axially compact design is also achieved. The lubricant feed and the annular duct can be arranged axially in the region of the driving tooth system.

Example aspects of the invention incorporate the technical teaching that the second ring gear of the second planetary gear set is connected to a coupling shaft for conjoint rotation. The coupling shaft is in the form, for example, of a sheet-metal shaped, annular disk-shaped component which is attached to the second ring gear for conjoint rotation, for example, via a crown gearing or the like. The coupling shaft can also be integrally connected, for example, integrally bonded, to the second ring gear of the second planetary gear set. A radial offset can be compensated for by the coupling shaft.

Preferably, the coupling shaft is connected to a connecting shaft for conjoint rotation, the connecting shaft being designed to be connected to one of the output shafts, in particular the second output shaft, for conjoint rotation. The connecting shaft can be integrally connected, for example, integrally bonded, to the coupling shaft, provided that the coupling shaft is not already integrally connected to the second ring gear. The coupling shaft transmits a drive power, i.e., a torque and a rotational speed, between the second ring gear of the second planetary gear set and the connecting shaft. The coupling shaft is understood to be, in particular, a ring gear carrier.

The connecting shaft is designed to transmit a drive power from the coupling shaft onto one of the output shafts, in particular the second output shaft, when the drive train is installed. The connecting shaft can also be designed to spatially accommodate and rotatably mount one of the two output shafts of the drive train, in particular the first output shaft, when the drive train is installed.

Preferably, a cover element is sealingly arranged spatially between the connecting shaft and the housing part. The cover element can have at least one radially extending and lubricant-conducting duct. A further lubricant feed arranged in the housing part can be provided in order to fluidically connect the lubricant supply of the transmission to the at least one duct in the cover element. The further lubricant feed is used, in particular, to supply lubricant to the first planetary gear set of the differential and to lubricate and cool bearing elements of the transmission.

The aforementioned lubricant feeds can be supplied separately with coolant and/or lubricant. The first lubricant feed can also be fluidically connected to at least the further lubricant feed, however. Therefore, only one lubricant supply for the transmission is necessary. The lubricant supply can be or include a pump, which delivers the coolant and/or lubricant at least to the two aforementioned lubricant feeds. The transmission also includes means for discharging the coolant and/or lubricant from the transmission, for example, a sump, which collects the coolant and/or lubricant and can at least indirectly return the coolant and/or lubricant into the circuit, i.e., in particular to the aforementioned lubricant feeds. The lubricant supply can also include at least one filter, in order to filter particles and other dirt out of the coolant and/or lubricant.

The cover element is preferably bolted on the housing part or is non-rotatably arranged thereon, wherein the connecting shaft can rotate relative to the cover element. The connecting shaft can be mounted for rotation with respect to the housing part via at least one bearing element. The cover element has means for ensuring that the connecting shaft can rotate relative to the cover element with as little friction as possible.

The cover element has means for sealing an interior space of the transmission with respect to the external atmosphere of the transmission and for sealing lubricant-conducting ducts. As a result, the transmission and the respective duct in the cover element are protected against dirt and/or moisture ingress. The at least one duct in the cover element can conduct coolant and/or lubricant from the further or the second lubricant feed inward and distribute the coolant and/or lubricant in order to lubricate the transmission components. The cover element therefore combines multiple functions. The cover element transfers lubricant. In addition, the at least one duct is sealed and protected against dirt. Multiple such coolant- and/or lubricant-guiding ducts, which are preferably uniformly distributed over the circumference, can be arranged on the perimeter of the cover element.

Furthermore, a slip ring and/or a sealing element, in particular a radial shaft seal, can be provided between the cover element and the connecting shaft in order to reduce friction between the cover element and the connecting shaft, which is mounted for rotation with respect cover element, during operation of the transmission. For this purpose, the slip ring is preferably secured on the inner circumference of the cover element, i.e., on the inner side of the cover element facing the connecting shaft.

In addition, further sealing elements, such as rectangular rings, can be arranged on the outer circumference of the connecting shaft. The further sealing elements can be arranged in grooves in the connecting shaft. The rectangular rings can be arranged such that the rectangular rings are radially supported against the slip ring and glide thereon. To this end, the slip ring can have tracks on the inner circumference. Rectangular rings are sealing rings with a rectangular, in particular square, cross-section. One advantage of rectangular rings is that the rectangular rings do not significantly deform even under higher pressures. Rectangular rings are therefore particularly dimensionally stable. The grooves secure the rectangular rings, in particular, in an axial position during the operation of the transmission. Rectangular rings allow for a defined and controlled leakage of lubricant. Lubricant from the at least one essentially radially extending duct between the rectangular rings and the slip ring can therefore reach, for example, bearing elements or other components to be lubricated, or seals of the transmission. Alternatively or additionally, sealing elements can be arranged radially between an outer circumference of the cover element and an inner circumference of the housing part, the sealing elements sealing the duct which is arranged in the cover element. The cover element can have grooves in order to position the sealing elements on the outer circumference of the cover element and hold the sealing elements in this position.

Furthermore, one or more bores, each of which is in the form of a discharge bore, can be arranged in the cover element, the bore(s) extending essentially radially and being provided for discharging coolant and/or lubricant from radially outside toward radially inside or vice versa. The discharge bore can be designed to discharge coolant and/or lubricant which has collected between the slip ring and the radial shaft seal.

The connecting shaft preferably has one or more transversal bores or ducts in the region of the at least one duct in the cover element, via which transversal bores or ducts at least a portion of the coolant and/or lubricant coming from the cover element reaches, radially inward, a hollow space in the connecting shaft, where the first output shaft can be arranged. When the drive train is installed, an annular chamber can be formed spatially between the first output shaft and the connecting shaft, via which the coolant and/or lubricant can be distributed in order to lubricate or cool bearing elements and gear set elements at least of the first planetary gear set.

The lubricant can be distributed from the annular chamber in various directions. Lubricant can be conducted on the inner circumference of the connecting shaft to a bearing element which supports the first output shaft relative to the connecting shaft. The coolant and/or lubricant can also be conducted on the inner circumference of the connecting shaft to further bearing elements, in particular radial and axial bearings of the differential.

Furthermore, the coolant and/or lubricant from the annular chamber, which is formed between the first output shaft and the connecting shaft when the drive train is installed, can be conducted via a spline between the first planet carrier of the first planetary gear set and the first output shaft in order to cool and/or lubricate, for example, further bearing elements.

A cover element designed in this way allows for easier installation of the connecting shaft on the housing part, in particular with a bearing element preinstalled thereon. The transmission is sealed and closed on one side while the cover element is installed and bolted in place.

A transport cover or the like can be provided on the axially opposite side of the transmission, which protects the transmission, as a preassembled unit for transport and/or storage, from contamination and/or moisture ingress. In this sense, the housing part has means for accommodating a transport cover. The transport cover is provided for a transport state or assembled state of the transmission. The transport cover sealingly closes the interior space of the transmission. Preferably, the transport cover is at least partially made of plastic, as a result of which the transport cover can be manufactured at low cost and the transmission has a low transport weight.

The term "operatively connected" is to be understood to mean a permanent connection between two components, the permanent connection being provided for permanently transmitting drive power, in particular rotational speed and/or torque. The connection can be established directly or via a fixed ratio. The connection can be established, for example, via a fixed shaft, a toothing, in particular a spur gear tooth system, and/or a wrap-around means.

The term "at least indirectly" is to be understood to mean that two components are (operatively) connected to each other via at least one further component, which is arranged between the two components, or are directly and, therefore, immediately connected to each other. Therefore, even more components can be arranged between shafts or gear wheels, the components being operatively connected to the shaft or to the gear wheel. With respect to the line system for conducting coolant and/or lubricant, the wording "at least indirectly" is to be understood to mean that the coolant and/or lubricant flows from a pump either directly or indirectly via further chambers, lines and/or ducts to the aforementioned lubricant feeds.

A drive train according to example aspects of the invention for a vehicle includes a transmission according to the preceding description, an input shaft, a first output shaft, and a second output shaft, wherein the differential of the transmission is operatively arranged between the input shaft and the two output shafts and distributes a drive power which is applied at the input shaft onto the two output shafts.

When the transmission in the assembled and/or transport state is temporarily sealingly closed with a transport cover in order to at least indirectly hold the components of the transmission in position and to hold the coolant and/or lubricant, which has already been introduced into the transmission interior, in the transmission interior, the transport cover is to be removed for and during the assembly of the drive train, wherein a drive unit can be subsequently connected to the transmission. A housing of the drive unit is fixedly connected to the housing part of the transmission according to example aspects of the invention, so that the housing part can be supported against the housing of the drive unit.

Since the preassembled transmission, according to example aspects of the invention, already fulfills all necessary functions which were otherwise also fulfilled, in part, by the drive unit, in particular the housing of the drive unit, it is only necessary to connect the transmission to the remaining components of the drive train which are operatively connected thereto. In particular, the housing part of the transmission must be secured on the housing of the drive unit, or vice versa; the input shaft of the drive unit must be connected to a gear set element for conjoint rotation, the gear set element forming the input part of the first planetary gear set; the first output shaft must be connected to a gear set element of the first planetary gear set for conjoint rotation, the gear set element forming the first output part of the differential; and the second output shaft must be connected to a gear set element of the second planetary gear set, the gear set element forming the second output part of the differential. In order to install the drive train, according to one exemplary embodiment, the input shaft of the drive unit must be drivingly connected to the first sun gear of the first planetary gear set, the first output shaft must be connected to the first planet carrier of the first planetary gear set for conjoint rotation, and the second output shaft must be connected to the second ring gear of the second planetary gear set for conjoint rotation, in order to form the drive train.

The transmission is therefore operatively connected to the drive unit via the input shaft when the drive train is installed. The drive unit is preferably an electric machine, wherein the input shaft of the drive unit is a rotor of the electric machine or is connected or coupled to the rotor or to a rotor shaft of the electric machine for conjoint rotation. The rotor is mounted for rotation with respect to a housing-fixed stator of the electric machine. The electric machine is preferably connected to an energy accumulator, which supplies the electric machine with electrical energy. Furthermore, the electric machine is preferably controllable by way of an open-loop or closed-loop system by a power electronics system. Alternatively, the drive unit can also be an internal combustion engine, wherein the input shaft in this case is, for example, a crankshaft, or is connected or coupled to the crankshaft for conjoint rotation.

The input shaft is preferably a hollow shaft. As a result, one of the output shafts, in particular the first output shaft, can extend axially through the input shaft. Preferably, one of the output shafts, in particular the first output shaft, extends through the transmission and, optionally, through the drive unit of the drive train. Therefore, the respective output shaft extends "inline" through the transmission in order to transmit a drive power onto the wheel of the vehicle, which is operatively connected to the transmission. The output shafts are advantageously coaxial in this case. Due to the coaxial arrangement of the output shafts, a radially slender design of the transmission can be realized. An arrangement of the output shafts in which the output shafts are parallel to and offset from each other is also conceivable and is implementable by appropriate gear stages.

The output shafts of the drive train are designed, in particular, to be operatively connected to a wheel on the vehicle. The respective output shaft can be connected to the associated wheel directly or indirectly, i.e., via, for example, a joint and/or a wheel hub.

A "shaft" is to be understood as a rotatable component of the transmission, via each of which associated components of the transmission are connected to one another for conjoint rotation. The respective shaft can connect the components to one another axially or radially or also both axially and radially. A shaft is not to be understood exclusively as a, for example, cylindrical, rotatably mounted machine element for transmitting torques, but rather is to be understood to also be general connecting elements which connect individual components or elements to one another, in particular, connecting elements which connect multiple elements to one another in a rotationally fixed manner.

Preferably, a first output torque is transmittable onto the first output shaft by the first planetary gear set. A support torque of the first planetary gear set is convertible in the second planetary gear set such that a second output torque, which corresponds to the first output torque, is transmittable onto the second output shaft.

The drive train according to example aspects of the invention is usable in a vehicle. Therefore, a vehicle has at least one such drive train. The vehicle is preferably a motor vehicle, in particular an automobile (for example, a passenger car having a weight of less than three and a half tons (3.5 t)), a bus, or a truck (bus and truck, for example, having a weight of over three and a half tons (3.5 t)). In particular, the vehicle is an electric vehicle or hybrid vehicle. The vehicle has at least two axles, wherein one of the axles is formed by an axle which is drivable by the drive train. The drive train according to example aspects of the invention is operatively arranged on this drivable axle and the drive train transmits a drive power of the drive unit onto the wheels on this axle via the transmission according to example aspects of the invention. It is also conceivable to provide such a drive train for each axle. The drive train is preferably front-wheel drive, such that the input shaft and the output shafts are aligned essentially transverse to the longitudinal axis of the vehicle. Alternatively, the drive train can be arranged obliquely with respect to the longitudinal and transverse axes of the vehicle, wherein the output shafts are connected via corresponding joints to the wheels on the respective axle, the axles being arranged transversely with respect to the longitudinal axis of the vehicle.

The aforementioned definitions and explanations of technical effects, advantages and advantageous embodiments of the transmission according to example aspects of the invention also apply by analogy to the drive train according to example aspects of the invention, and vice versa.

BRIEF DESCRIPTION OF THE DRAWINGS

An exemplary embodiment of the invention is explained in greater detail in the following with reference to the schematic drawings, in which identical or similar elements are provided with the same reference characters. Wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
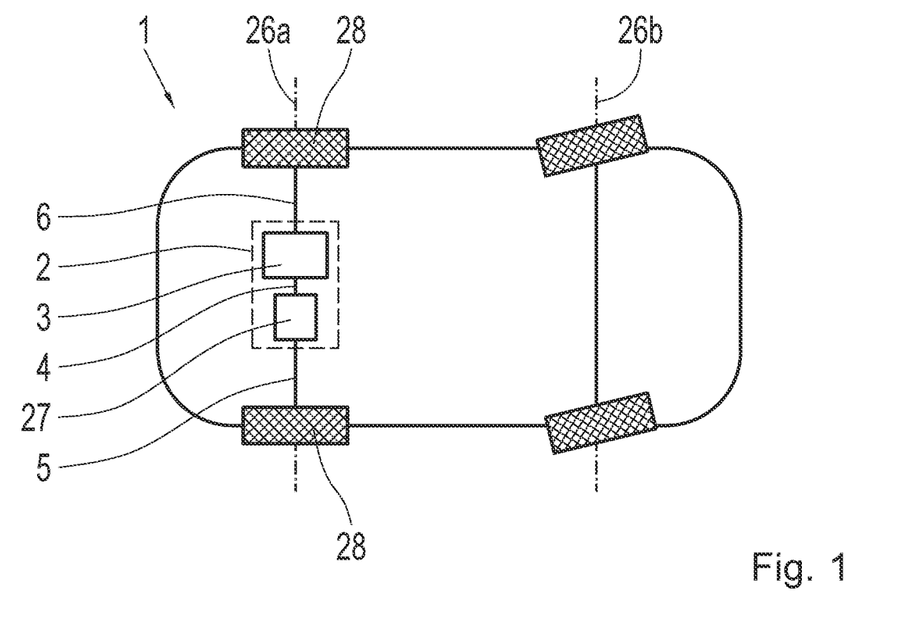
FIG. 1 shows a highly schematized top view of an exemplary vehicle with a drive train according to example aspects of the invention and a transmission according to example aspects of the invention, according to a preferred example embodiment.

FIG. 1 shows a vehicle 1 with two axles 26a, 26b, wherein a drive train 2 according to the invention is drivingly arranged at the first axle 26a. The vehicle 1 is an electric vehicle in this case, the vehicle 1 being driven purely electrically. The first axle 26a can be either a front axle or a rear axle of the vehicle 1 and forms a driven axle of the vehicle 1. In this case, the drive train 2 is arranged, for example, on a non-steerable rear axle of the vehicle 1.

The drive train 2 includes a drive unit 27, which is in the form of an electric machine, and a transmission 3 which is operatively connected thereto. The design and the arrangement of the transmission 3 are explained in greater detail in the following figures. The design of the drive unit 27 is not shown here. In any case, the drive unit 27 or the electric machine has an accumulator, which supplies the drive unit 27 with electrical energy, and a power electronics system for the open-loop control and closed-loop control of the drive unit 27. A rotor (not shown here), which is arranged so as to be rotatable with respect to the stator and which is connected to an input shaft 4 (shown as an arrow in FIG. 2) for conjoint rotation, is set into rotation relative to the stator by energizing the stator (not shown here). The input shaft 4 is to be understood as a drive shaft, which transfers a drive power of the drive unit 27 into the transmission 3, the drive power being converted by a differential 7, which is in the form of an integral differential, and distributed onto a first output shaft 5 and a second output shaft 6.

Figure 2:
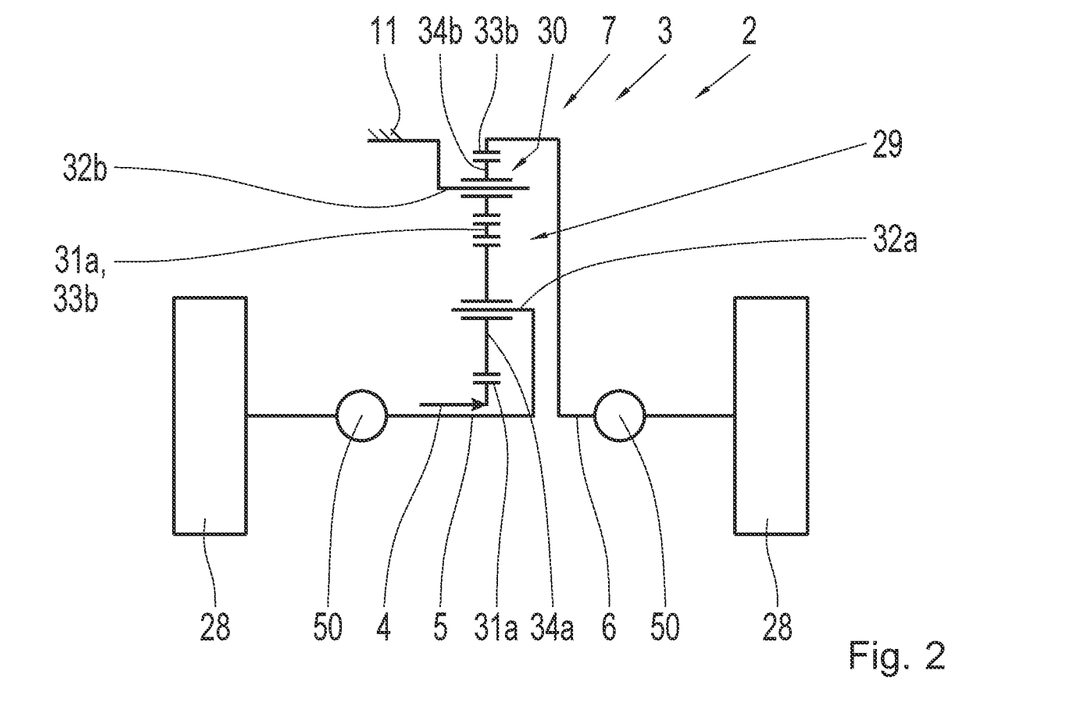
FIG. 2 shows a highly simplified representation of the transmission according to example aspects of the invention shown in FIG. 1.

The drive unit 27 is coaxial to the integral differential 7. Similarly, the output shafts 5, 6 are coaxial and, when the drive train 2 is installed, extend in opposing directions from the transmission 3 to wheels 28 on the first axle 26a. As shown in FIG. 2, joints 50 are arranged between the respective wheel 28 and the output shafts 5, 6 in order to compensate for possible inclinations of the output shafts 5, 6 with respect to wheel hubs (not shown here) on the first axle 26*a*.

Figure 3:
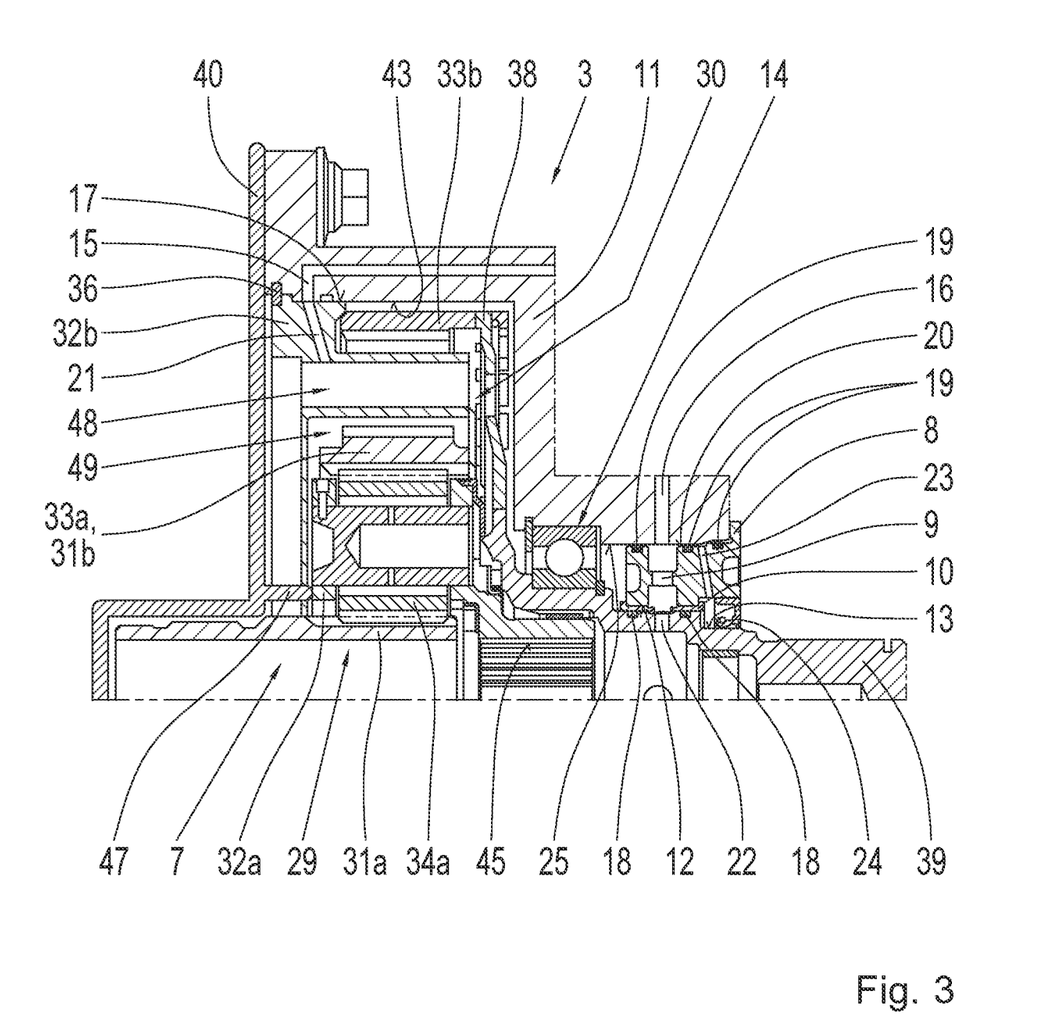
FIG. 3 shows a schematic partial sectional view of the transmission according to example aspects of the invention shown in FIG. 1 and FIG. 2.
Figure 4:
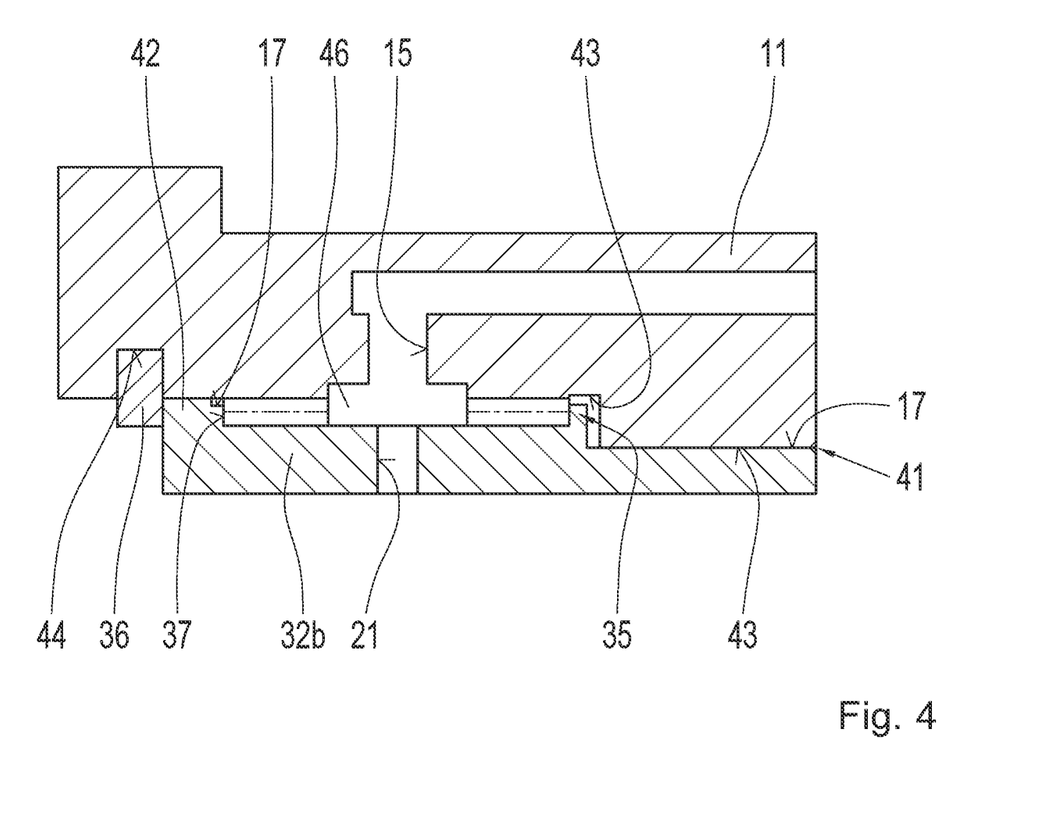
FIG. 4 shows a highly schematized partial sectional view of an interface between a planet carrier of a second planetary gear set and a transmission part of the transmission according to example aspects of the invention shown in FIG. 1 through FIG. 3.

The transmission 3 shown in FIG. 2 through FIG. 4 is a differential gear. The differential 7 has a first planetary gear set 29, which includes multiple gear set elements, and a second planetary gear set 30, which also includes multiple gear set elements and which is operatively connected to the first planetary gear set 29. A first output torque is transmittable onto the second output shaft 6 by the first planetary gear set 29. A support torque of the first planetary gear set 29 is convertible in the second planetary gear set 30 such that a second output torque, which corresponds to the first output torque, is transmittable onto the first output shaft 5.

The first planetary gear set 29 and the second planetary gear set 30 are both in the form of a negative planetary gear set and are radially nested and, therefore, arranged in a common plane, the common plane extending perpendicularly to the axle 26*a*. As a result, axial installation space of the transmission 3 is reduced. The first planetary gear set 29 is arranged radially inside the second planetary gear set 30 in the present case.

On the first planetary gear set 29, the first gear set element is a first sun gear 31*a*, the second gear set element is a first planet carrier 32*a* and the third gear set element is a first ring gear 33*a*, wherein, on the first planet carrier 32*a*, multiple first planet gears 34*a* are rotatably mounted on planet shafts (not shown here). The first planet gears 34*a* are meshed with the first sun gear 31*a* and with the first ring gear 33*a*.

The first output shaft 5 extends axially through the transmission 3, in particular through the integral differential 7, and through the drive unit 27. Thus the first output shaft 5 also extends axially through the first sun gear 31*a* of the first planetary gear set 29. Therefore, the first sun gear 31*a* is in the form of a gear wheel, which is hollow inside, and the input shaft 4, which is connected thereto for conjoint rotation, is in the form of a hollow shaft.

On the second planetary gear set 30, the first gear set element is a second sun gear 31*b*, the second gear set element is a second planet carrier 32*b* and the third gear set element is a second ring gear 33*b*, wherein, on the second planet carrier 32*b*, multiple first planet gears 34*b* are rotatably mounted on planet shafts (not shown here). The second planet gears 34*b* are meshed with the second sun gear 31*b* and with the second ring gear 33*b*.

The first sun gear 31*a* of the first planetary gear set 29 is designed to be connected to the input shaft 4 for conjoint rotation when the drive train 2 is installed. The first planet carrier 32*a* of the first planetary gear set 29 is designed to be connected via a spline 45 to the first output shaft 5 for conjoint rotation when the drive train 2 is installed. The first ring gear 33*a* of the first planetary gear set 29 is connected to the second sun gear 31*b* of the second planetary gear set 30 for conjoint rotation, being integrally connected thereto in this case. In addition, the second ring gear 33*b* of the second planetary gear set 30 is connected to a connecting shaft 39 for conjoint rotation via an annular disk-shaped coupling shaft 38, which is in the form of a ring gear carrier in this case, the connecting shaft 39 being designed to be connected to the second output shaft 6 for conjoint rotation when the drive train 2 is installed. The connecting shaft 39 is rotatably mounted on the housing part 11 via a bearing element 14.

It is explicitly pointed out that the assignment of the gear set elements to the elements of the respective planetary gear set 29, 30 can be interchanged in any way, wherein, in any case, the second planet carrier 32*b* is arranged on the housing part 11 in a rotationally and axially fixed manner. The connection of the gear set elements sun gear, planet carrier and ring gear is implemented according to the requirements with respect to the ratios, including signs. Instead of a negative planetary gear set, the respective planetary gear set 29, 30 can always also be in the form of a positive planetary gear set by interchanging the connection of the first planet carrier and the first ring gear and increasing the absolute value of the stationary gear ratio by one (1). This may also be correspondingly reversed. Furthermore, it is conceivable to arrange one additional gear stage between the drive unit 27 and the transmission 3, the gear stage being in the form, for example, of a spur gear stage or a planetary transmission having one or more planetary gear set(s), in order to increase an overall gear ratio of the drive.

The housing part 11 has a first lubricant feed 15 and a second lubricant feed 16, which is fluidically connected to the first lubricant feed 15. The two lubricant feeds 15, 16 can be fluidically connected to each other via a line system (not shown here), wherein coolant and/or lubricant is conveyed via the line system and the lubricant feeds 15, 16 into the interior space 49 of the transmission 3 and distributed there. The coolant and/or lubricant is referred to in the following only as lubricant for the sake of simplicity. The line system is fluidically connected to a lubricant supply (not shown here), which conveys lubricant into the system.

The first lubricant feed 15 is designed to fluidically connect the lubricant supply of the transmission 3 to an annular duct 46 as shown in FIG. 4, the annular duct 46 being formed fully circumferentially between an outer circumference 17 of a planet carrier 32*b* of the second planetary gear set 30 and a first inner circumference 43 of the housing part 11. In the present case, the annular duct 46 is integrated in the housing part 11 on the first inner circumference 43 of the housing part 11. The annular duct 46 is connected to a fluid chamber 48 as shown in FIG. 3 via multiple first ducts 21, which are arranged on the second planet carrier 32*b* extending partly radially, partly axially. The fluid chamber 48 conducts the lubricant to a planet shaft (not shown here) of the second planetary gear set 30. The annular duct 46 can be sealed (not shown here for the sake of simplicity) with respect to the rest of the transmission interior 49 by two sealing elements, which are arranged between the housing part 11 and the outer circumference 17 of the second planet carrier 32*b*. Lubricant for lubricating the bearings of the second planet gears 34*b* is therefore conducted via the first ducts 21.

The second planet carrier 32*b* of the second planetary gear set 30 is supported against and non-rotatably mounted on a housing part 11, which is a transmission cover in the present case. In this sense, a driving tooth system 35 for non-rotatably arranging the second planet carrier 32*b* on the housing part 11 is arranged in the region of the annular duct 46 between the second planet carrier 32*b* and the housing part 11. The driving tooth system 35 acts as a torque support of the transmission 3 and of the differential 7.

In addition, a securing ring 36 is provided in order to axially secure the second planet carrier 32*b*. The securing ring 36 is radially accommodated and axially positioned in a circumferential groove 44. The securing ring 36 and an axial stop 37 of the driving tooth system 35 clamp a radial projection 42 on the second planet carrier 32*b* between themselves, as a result of which the second planet carrier 32*b* cannot be axially displaced.

When the second planetary gear set 30 is installed, the second planet carrier 32*b* is inserted axially into the housing part 11, the planet carrier 32*b* being radially secured on the housing part 11 via a centering 41. In the present case, the driving tooth system 35 and the lubricant feed 15, including the annular duct 46, are arranged axially between the securing ring 36 and the centering 41.

FIG. 3 shows an assembled and transport state of the transmission 3, in which the transmission 3, in the preassembled state, has not yet been connected to the drive unit 27 or to other components of the drive train 2. The components of the transmission 3 have already been arranged inside the housing part 11 and secured in position. The housing part 11 is sealingly closed by a transport cover 40, which is made of plastic and which at least axially secures the gear set elements of the planetary gear sets 29, 30 in position. To this end, the transport cover 40 can have axial projections 47 which abut the gear set elements which are to be axially secured. In FIG. 3, such an exemplary axial projection 47 axially abuts the first planet carrier 32a of the first planetary gear set 29. The transport cover 40 is detachably connected to the housing part 11 so that the transport cover 40 can be removed when the drive unit 27 is to be connected, with the input shaft 4, to the transmission 3 in order to install the drive train 2. In this sense, the housing part 11 has means for accommodating a transport cover 40.

On an opposite side of the housing part 11, a cover element 8, with which the transmission interior 49 is sealingly closed, is arranged spatially between the connecting shaft 39 and the housing part 11. The second lubricant feed 16 is designed to conduct lubricant to the cover element 8. As shown in FIG. 3, the cover element 8 has multiple second ducts 9, which are uniformly distributed over the circumference and which extend essentially radially. Lubricant is conveyed via the respective second duct 9 radially from the outside, i.e., from the second lubricant feed 16, radially inward to the connecting shaft 39, from where the lubricant is distributed in the transmission 3, in particularly for lubricating the output shafts 5, 6, the corresponding bearing points, and the gear set elements of the first planetary gear set 29. The components of the transmission 3, in particular the gear set elements of the differential 7, connecting points and shafts, and bearing points are lubricated and cooled via the lubricant feeds 15, 16 (shown here). Further lubricant feeds (not shown here) are also conceivable.

A slip ring 10 is arranged spatially between the cover element 8 and the connecting shaft 39. When the cover element 8 is installed, the slip ring 10 is arranged radially between an inner circumference 12 of the cover element 8 and an outer circumference 13 of the second connecting shaft 39 and reduces friction between the housing-fixed cover element 8 and the connecting shaft 39, which is mounted for rotation with respect to the cover element 8. Furthermore, sealing elements 18 in the form of rectangular rings are arranged between the slip ring 10 and the connecting shaft 39, the sealing elements 18 being designed to emit a defined amount of leakage between the slip ring 10 and the connecting shaft 39 into the transmission interior 49.

The slip ring 10 has a number of passage openings corresponding to the second ducts 9. One passage opening aligns with a third duct 22 in each case, the third duct 22 being in the form of a transversal bore in the connecting shaft 39. Furthermore, a radial shaft seal 24 is sealingly arranged radially between the cover element 8 and the second output shaft 6 in order to seal the transmission interior 49 with respect to the external atmosphere of the transmission 3. The cover element 8 has at least one essentially radially extending discharge bore 23, which is designed to return lubricant from radially inside to radially outside.

Further sealing elements 19 are arranged radially between an outer circumference 20 of the cover element 8 and a second inner circumference 25 of the housing part 11. The sealing elements 19 are axially spaced apart from one another on the cover element 8. Two of the sealing elements 19 are provided for sealing the second duct 9 in the cover element 8. One of these sealing elements 19 and another sealing element 19 are provided for sealing the discharge bore 23. The sealing element 19 situated in the center in an axial direction therefore fluidically separates the second duct 9 from the discharge bore 23.

The cover element 8 is a cover for bridging a change of diameter between the bearing element 14 and the radial shaft seal 24. The cover element 8 is in the form of a seat for the radial shaft seal 24. Lubricant is transferred from radially outside toward radially inside via the cover element 8 without additional lines or ducts. The cover element 8 also enables lubricant to drain from radially inside toward radially outside via the respective discharge bore 23. In addition, the cover element 8 is designed or equipped with seals 18, 19 such that the second and third ducts 9, 22 and the respective discharge bore 23 are sealed.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 vehicle
2 drive train
3 transmission
4 input shaft
5 first output shaft
6 second output shaft
7 differential
8 cover element
9 second duct
10 slip ring
11 housing part
12 inner circumference of the cover element
13 outer circumference of the connecting shaft
14 bearing element
15 first lubricant feed
16 second lubricant feed
17 outer circumference of the second planet carrier of the second planetary gear set
18 first sealing element
19 second sealing element
20 outer circumference of the cover element
21 first duct
22 third duct
23 discharge bore
24 radial shaft seal
25 second inner circumference of the housing part
26a first axle
26b second axle 27 drive unit
28 wheel
29 first planetary gear set
30 second planetary gear set
31a first sun gear of the first planetary gear set
31b second sun gear of the second planetary gear set
32a first planet carrier of the first planetary gear set
32b second planet carrier of the second planetary gear set
33a first ring gear of the first planetary gear set
33b second ring gear of the second planetary gear set
34a first planet gear of the first planetary gear set
34b second planet gear of the second planetary gear set
35 driving tooth system
36 securing ring
37 axial stop on the housing part
38 coupling shaft
39 connecting shaft
40 transport cover
41 centering
42 radial projection on the planet carrier of the second planetary gear set
43 first inner circumference of the housing part
44 groove in the housing part
45 spline
46 annular duct
47 axial projection
48 fluid chamber
49 transmission interior
50 joint

The invention claimed is:

1. A transmission (3) for a drive train (2) of a vehicle (1), comprising:
    a housing part (11);
    a differential (7) arranged within the housing part (11), the differential comprising a first planetary gear set (29) and a second planetary gear set (30), the second planetary gear set (30) operatively connected to the first planetary gear set (29),
    wherein the housing part (11) comprises a lubricant feed (15) configured to fluidically connect a lubricant supply of the transmission (3) to an annular duct (46) formed, at least partially circumferentially, spatially between a planet carrier (32b) of the second planetary gear set (30) and the housing part (11), and
    wherein the planet carrier (32b) of the second planetary gear set (30) is rotationally fixed and axially secured on the housing part (11),
    wherein the planet carrier (32b) of the second planetary gear set (30) is connected to the housing part (11) for conjoint rotation via a driving tooth system (35) the housing part (11) comprising an internal toothing on its inner circumference, which is meshed with an external toothing formed on the outer circumference of the planet carrier (32b) of the second planetary gear set (30).

2. The transmission (3) of claim 1, further comprising a securing ring (36) configured to axially secure the planet carrier (32b) of the second planetary gear set (30).

3. The transmission (3) of claim 2, wherein a radial projection (42) on the planet carrier (32b) of the second planetary gear set (30) is arranged axially between the securing ring (36) and an axial stop (37) on the housing part (11).

4. The transmission (3) of claim 1, wherein the planet carrier (32b) of the second planetary gear set (30) is radially secured on the housing part (11) via at least one centering (41).

5. The transmission (3) of claim 4,
    wherein the driving tooth system (35) is arranged axially between a securing ring (36) and the centering (41).

6. The transmission (3) of claim 4,
    wherein the lubricant feed (15) is arranged axially between a securing ring (36) and the centering (41).

7. The transmission (3) of claim 1, wherein:
    a first sun gear (31a) of the first planetary gear set (29) is configured for connection to an input shaft (4) for conjoint rotation;
    a first planet carrier (32a) of the first planetary gear set (29) is configured for at least indirect connection to a first output shaft (5) for conjoint rotation;
    a first ring gear (33a) of the first planetary gear set (29) is at least indirectly connected to a second sun gear (31b) of the second planetary gear set (30) for conjoint rotation; and
    a second ring gear (33b) of the second planetary gear set (30) is configured for at least indirectly connection to a second output shaft (6) for conjoint rotation.

8. The transmission (3) of claim 7, wherein the second ring gear (33b) of the second planetary gear set (30) is connected to a coupling shaft (38) for conjoint rotation.

9. The transmission (3) of claim 8, wherein the coupling shaft (38) is connected to a connecting shaft (39) for conjoint rotation, the connecting shaft being configured for connection to one of the first and second output shafts (5, 6) for conjoint rotation.

10. The transmission (3) of claim 9, further comprising a cover element (8) sealingly arranged spatially between the connecting shaft (39) and the housing part (11).

11. The transmission (3) of claim 1, wherein the housing part (11) accommodates a transport cover (40).

12. The transmission (3) of claim 11, wherein the transport cover (40) is at least partially made of plastic.

13. A drive train (2) for a vehicle (1), comprising:
    the transmission (3) of claim 1;
    an input shaft (4);
    a first output shaft (5); and
    a second output shaft (6),
    wherein the differential (7) of the transmission (3) is operatively arranged between the input shaft (4) and the first and second output shafts (5, 6), and the differential (7) is configured to distribute a drive power applied at the input shaft (4) onto the first and second output shafts (5, 6).

14. The drive train (2) of claim 13, wherein a first output torque is at least indirectly transmittable onto the first output shaft (5) by the first planetary gear set (29), a support torque of the first planetary gear set (29) is convertible in the second planetary gear set (30) such that a second output torque, which corresponds to the first output torque, is transmittable onto the second output shaft (6).

* * * * *